(12) United States Patent
Matsuoka et al.

(10) Patent No.: US 11,837,919 B2
(45) Date of Patent: Dec. 5, 2023

(54) ROTARY ELECTRIC MACHINE

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Yusuke Matsuoka, Higashiosaka (JP); Masakatsu Matsubara, Mie (JP); Kazuo Aoki, Mie (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 520 days.

(21) Appl. No.: 17/024,993

(22) Filed: Sep. 18, 2020

(65) Prior Publication Data

US 2021/0006111 A1 Jan. 7, 2021

Related U.S. Application Data

(63) Continuation of application No. PCT/JP2018/033517, filed on Sep. 10, 2018.

(30) Foreign Application Priority Data

Mar. 20, 2018 (JP) .................................. 2018-053324

(51) Int. Cl.
*H02K 1/27* (2022.01)
*H02K 1/17* (2006.01)
*H02K 1/276* (2022.01)

(52) U.S. Cl.
CPC ............... *H02K 1/276* (2013.01); *H02K 1/17* (2013.01)

(58) Field of Classification Search
CPC ........ H02K 1/17; H02K 1/276; H02K 1/2766; H02K 21/14; H02K 2213/03
(Continued)

(56) References Cited

U.S. PATENT DOCUMENTS 8,760,026 B2 * 6/2014 Suzuki ................. H02K 1/2766
310/156.53
9,190,877 B2 * 11/2015 Takahashi ............ H02K 1/2766
(Continued)

FOREIGN PATENT DOCUMENTS

JP 2005-184957 A 7/2005
JP 2010-080799 A 4/2010
(Continued)

OTHER PUBLICATIONS

International Search Report dated Nov. 27, 2018 in PCT/JP2018/033517 filed on Sep. 10, 2018, 2 pages.

*Primary Examiner* — Alex W Mok
(74) *Attorney, Agent, or Firm* — Maier & Maier, PLLC

(57) ABSTRACT

According to one embodiment, a rotor core satisfies a relationship: $W2/W1 \leq (A1+A2)/A1$. Where, A1 represents an area of a region defined by a polar central axis, an outer circumferential surface of the rotor core and a first imaginary linear line extending on an outer circumferential-side long edge of an embedding hole, A2 represents an area of a region defined by the polar central axis, a q-axis, the outer circumferential surface of the rotor core, a second imaginary linear line extending on an inner circumferential-side long edge of the embedding hole, a third imaginary linear line extending on a first edge of the cavity hole, W1 represents a half-width of a first bridge portion, and W2 represents a half-width of the second bridge portion.

6 Claims, 2 Drawing Sheets

(58) Field of Classification Search
USPC .................................................. 310/156.01
See application file for complete search history.

(56) References Cited

U.S. PATENT DOCUMENTS

| | | | |
|---|---|---|---|
| 9,312,731 B2* | 4/2016 | Takahashi | H02K 1/2706 |
| 9,735,632 B2* | 8/2017 | Iki | H02K 1/2766 |
| 2001/0017492 A1* | 8/2001 | Tajima | H02K 1/276 |
| | | | 310/156.57 |
| 2010/0079025 A1 | 4/2010 | Suzuki et al. | |
| 2012/0049686 A1* | 3/2012 | Mizui | H02K 1/28 |
| | | | 310/156.53 |
| 2012/0194026 A1* | 8/2012 | Matsuoka | H02K 1/2766 |
| | | | 310/156.53 |
| 2013/0207498 A1* | 8/2013 | Kusase | H02K 1/16 |
| | | | 310/156.01 |
| 2014/0125183 A1* | 5/2014 | Takahashi | H02K 1/2766 |
| | | | 310/156.53 |
| 2015/0137650 A1* | 5/2015 | Takahashi | H02K 1/32 |
| | | | 310/156.56 |
| 2016/0006307 A1 | 1/2016 | Yokota et al. | |

FOREIGN PATENT DOCUMENTS

| | | |
|---|---|---|
| JP | 2014-075882 A | 4/2014 |
| WO | WO 2014/174579 A1 | 10/2014 |

* cited by examiner

ROTARY ELECTRIC MACHINE

CROSS-REFERENCE TO RELATED APPLICATIONS

This application is a Continuation Application of PCT Application No. PCT/JP2018/033517, filed Sep. 10, 2018 and based upon and claiming the benefit of priority from Japanese Patent Application No. 2018-053324, filed Mar. 20, 2018, the entire contents of all of which are incorporated herein by reference.

FIELD

Embodiments described herein relate generally to a rotary electric machine in which a permanent magnet is provided on a rotor.

BACKGROUND

Recently, research and development of permanent magnets have been remarkably advanced, and therefore permanent magnets of a high magnetic energy product are developed. Permanent magnet-type rotary electric machines which employ such a permanent magnet are applied as electric motors or power generators of electric trains and vehicles. Generally, a permanent magnet-type rotary electric machine comprises a cylindrical hollow stator and a columnar rotor rotatably supported inside the stator. The rotor comprises a rotor core and a plurality of permanent magnets embedded in the rotor core.

For such permanent magnet-type rotary electric machines, it is proposed that a pair of permanent magnets are arranged to open symmetrically towards an outer circumferential surface side from an inner circumferential surface side in each magnetic pole, so as to create a magnetic circuit which can utilize reluctance torque in addition to magnet torque.

When a rotary electric machine is used as a drive source of a moving body such as a vehicle, it is required for the rotary electric machine to occupy a small space for installation and achieve high torque and high output in such a limited space. Further, for the same torque, rotary electric machines are required to be light in weight as possible.

DETAILED DESCRIPTION

Figure 1:
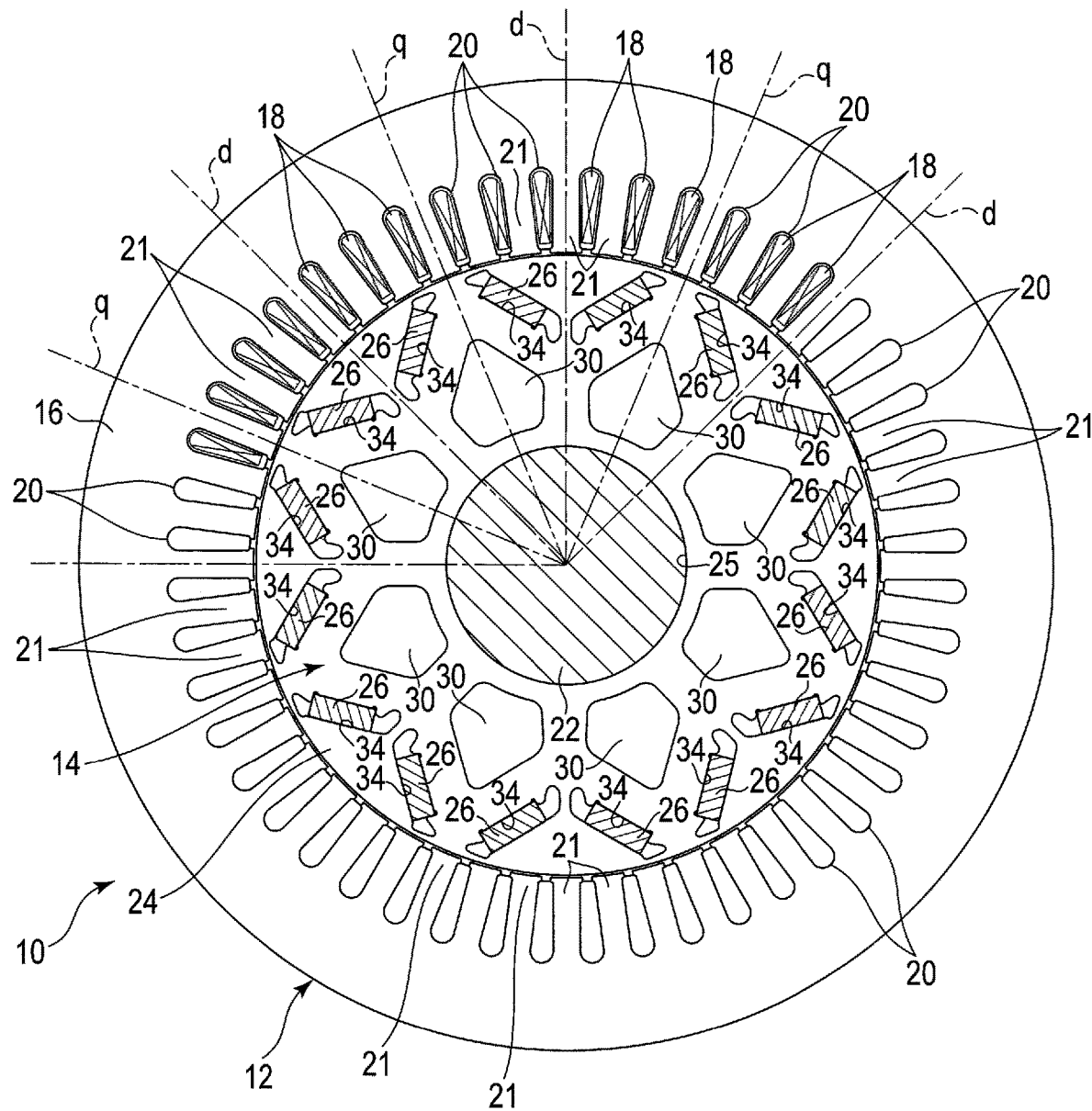
FIG. 1 is a lateral cross-section of a permanent magnet-type rotary electric machine according to an embodiment.

Embodiments will be described hereinafter with reference to the accompanying drawings.

In general, according to one embodiment, a rotary electric machine comprises a stator comprising a stator core and an armature coil and a rotor comprising a shaft rotatable around a central axis, a rotor core coaxially fixed to the shaft and comprising a plurality of magnetic poles arranged along a circumferential direction, and a plurality of permanent magnets embedded in the rotor core and disposed in the plurality of magnetic poles respectively. The rotor core comprises a plurality of polar central axes each passing the central axal line and a center of the respective magnetic pole and extending radially with respect to the central axal line, two embedding holes in each of the plurality of magnetic poles, provided on respective sides of the respective polar central axis, in which the respective permanent magnets are loaded, a plurality of cavity holes each provided between each respective adjacent pair of magnetic poles to oppose the embedding holes, respectively, with a gap therebetween, a first bridge portion defined between the two embedding holes on each polar central axis, and a second bridge portion defined between each respective adjacent pair of two cavity holes on each polar central axis. In each of the plurality of magnetic poles, the two embedding holes and two permanent magnets each comprise an inner circumferential-side edge adjacent to the respective polar central axis and an outer circumferential-side edge adjacent to an outer circumferential surface of the rotor core, and disposed to be line symmetrical with respect to the respective polar central axis such that a distance from the polar central axis gradually expands from the inner circumferential-side edge toward the outer circumferential-side edge. Each of the embedding holes comprises a magnet loading region in which the respective permanent magnet is located, defined by an inner circumferential-side long edge and an outer circumferential-side long edge opposing parallel to each other, an inner circumferential-side cavity expanding from the inner circumferential-side edge of the respective permanent magnet towards the respective polar central axis, and an outer circumferential-side cavity expanding from the outer circumferential-side edge of the respective permanent magnet towards the circumferential surface, and each of the plurality of cavity holes is defined by a first edge and a second edge opposing each other each with a gap from the inner circumferential-side long edge of the respective embedding holes provided in each respective adjacent pair of magnetic poles, and a third edge and a fourth edge opposing from each other with a gap from the polar central axis of each of the adjacent pair of magnetic poles.

In each magnetic pole, when an axis electrically orthogonal to the respective polar central axis is defined as a q-axis, A1 represents an area of a region defined by the respective polar central axis, the outer circumferential surface of the rotor core and a first imaginary linear line extending on the outer circumferential-side long edge of the respective embedding hole and intersecting the respective polar central axis and the outer circumferential surface of the rotor core, A2 represents an area of a region defined by the respective polar central axis, the respective q-axis, the outer circumferential surface of the rotor core, a second imaginary linear line extending on the inner circumferential-side long edge of the respective embedding hole and intersecting the respective polar central axis and the outer circumferential surface of the rotor core, a third imaginary linear line extending on the first edge of the respective cavity hole and intersecting the respective polar central axis and the respective q-axis, W1 represents a half-width of the first bridge portion, and W2 represents a half-width of the second bridge portion, the rotor core is formed to satisfy a relationship: $W2/W1 \leq (A1+A2)/A1$.

Various embodiments will be described below with reference to the drawings. Throughout the embodiments, common configurations are given the same symbol, and duplicated explanations are omitted. Each figure is a schematic view for explaining the embodiments and facilitating understandings thereof, and the shape, the dimension, the ratio and the like in the figure may be different from those of the actual apparatus, but they can be appropriately designed and changed by referring to the following descriptions and publicly known techniques.

Figure 2:
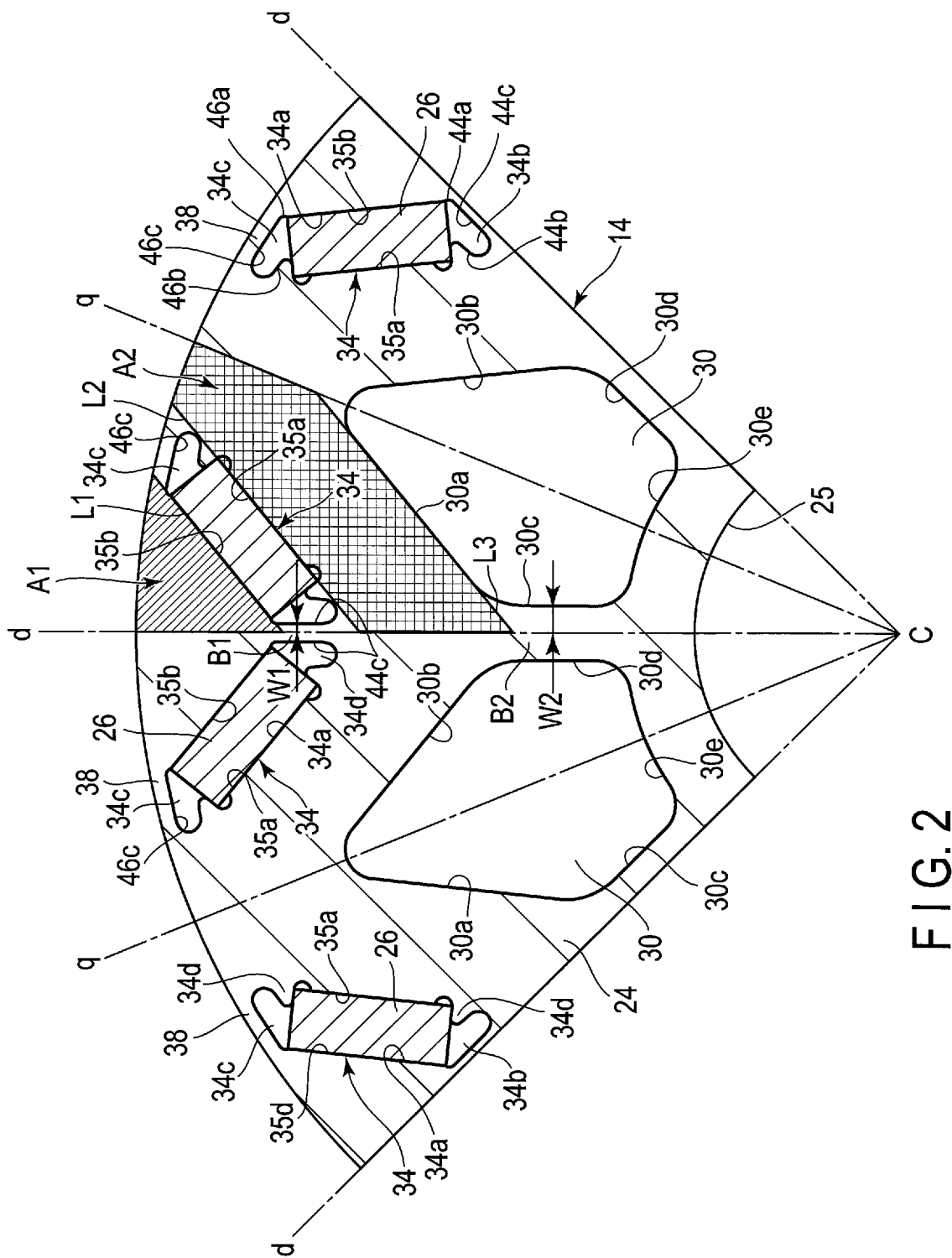
FIG. 2 is a partially enlarged lateral cross section of a rotor of the rotary electric machine.

FIG. 1 is a lateral cross-section of a permanent magnet-type rotary electric machine according to an embodiment. FIG. 2 is a partially enlarged lateral cross section of a rotor thereof.

As shown in FIG. 1, a rotary electric machine 10 is configured as, for example, an inner rotor-type rotary electric machine and comprises an annular or cylindrical stator 12 supported on a fixed frame (not shown) and a rotor 14 supported inside the stator 12 so as to be rotatable around a central axal line CL and coaxially with the stator 12. The rotary electric machine 10 is applicable to, for example, a drive motor or a power generator in hybrid vehicles (HEV) and electric vehicles (EV).

The stator 12 comprises a cylindrical stator core 16 and an armature coil 18 wound around the stator core 16. The stator core 16 is prepared by laminating a great number of cylindrical electromagnetic steel plates of a magnetic material such as silicon steel, coaxially one on another. In an inner circumferential portion of the stator core 16, a plurality of slots 20 are formed. The slots 20 are arranged along a circumferential direction at equal intervals. Each slot 20 is opened in an inner circumferential surface of the stator core 16 and extends radially from the inner circumferential surface. Further, each slot 20 extends over a full axial length of the stator core 16. With the plurality of slots 20 thus formed, the inner circumferential portion of the stator core 16 are formed into a plurality of (for example, forty eight in this embodiment) stator teeth 21 facing the rotor 14. The armature coil 18 is embedded in a plurality of slots 20 and wound around each of the stator teeth 21. When applying current to the armature coil 18, a predetermined flux linkage is formed in the stator 12 (the stator teeth 21).

The rotor 14 includes a columnar shaft (rotating shaft) 22, both ends of which are rotatably supported by bearings (not shown), a cylindrical rotor core 24 fixed to, substantially, a axial central portion of the shaft 22 and a plurality of permanent magnets 26 embedded in the rotor core 24. The rotor 14 is disposed coaxially inside the stator 12 with a slight gap therebetween. In other words, an outer circumferential surface of the rotor 14 opposes the inner circumferential surface of the stator 12 with a slight gap (air gap) therebetween. The rotor core 24 comprises an inner hall 25 formed coaxially with the central axis C. The shaft 22 is passed through the inner hall 25 to engage therewith, and extend coaxially with the rotor core 24. The rotor core 24 is configured as a layered body in which a great number of annular electromagnetic steel plates 24a of a magnetic material such as silicon steel are coaxially laminated.

In this embodiment, the rotor 14 is set to be a plurality of, for example, eight magnetic poles. In the rotor core 24, axes each passing through the central axis C and the center of each magnetic pole to extend in a diametrical direction or a radial direction with respect to the central axis C are referred to as d-axes and axes each located electrically and magnetically distant at an angle of 90 degrees from the respective q-axis are referred to d-axes. Here, the q-axes are set along directions in which the flux linkage to be formed by the stator 12 easily flow. The d-axes and the q-axes are provided alternately along a circumferential direction of the rotor core 24 in a predetermined phase. One magnetic pole of the rotor core 24 refers to a region between adjacent q-axes (an octant angular region). Thus, the rotor core 24 is configured as octapolar (eight magnetic poles). A circumferential center of one magnetic pole is a d-axis.

As shown in FIGS. 1 and 2, in the rotor core 24, two permanent magnets 26 are embedded in each magnetic pole. In the circumferential direction of the rotor core 24, magnet embedding holes (to be referred to as embedding holes hereinafter) 34 having a shape corresponding to that of the permanent magnets 26 are made on both sides of each d-axis. Two permanent magnets 26 are respectively loaded and placed in these embedding holes 34, and are fixed to the rotor core 24 by, for example, adhesive or the like.

The embedding holes 34 each extend and penetrate through the rotor core 24 in its axial direction. The embedding holes 34 have substantially a rectangular cross section which is inclined to the respective d-axis. When viewed in a cross section normal to the central axis C of the rotor core 24, each pair of two embedding holes 34 are arranged in, for example, substantially a V-shape manner. More specifically, inner circumferential edges of each pair of two embedding holes 34 are located close to the respective d-axis and also to oppose each other with a slight gap therebetween. In the rotor core 24, a narrow magnetic path slender portion (a first bridge portion) 36 is formed between inner circumferential-side edges of each pair of two embedding holes 34. Outer circumferential-side edges of the two embedding holes 34 are located distant from the respective d-axis along the circumferential direction of the rotor core 24, but close to the outer circumferential surface of the rotor core 24 and the respective q-axis. With this arrangement, the outer circumferential-side edge of each embedding hole 34 is disposed to oppose the outer circumferential-side edge of the respective embedding hole 34 of the adjacent magnetic pole while interposing the respective q-axis therebetween. In the rotor core 24, a narrow magnetic path slender portion (bridge portion) 38 is formed between the outer circumferential-side edge of each of the embedding holes 34 and the outer circumferential surface of the rotor core 24. With this arrangement, each pair of two embedding holes 34 are disposed in such a manner that the distance from the respective d-axis gradually expands from the inner circumferential-side edge towards the outer circumferential-side edge.

As shown in FIG. 2, the permanent magnets 26 each are formed to have a rectangular cross section, a first surface and a second surface (rear surface) opposing parallel to each other and a pair of side surfaces opposing to each other.

The embedding holes 34 each comprise a magnet loading region 34a of a rectangular shape corresponding to the cross-sectional shape of the permanent magnets 26, two cavities (an inner circumferential-side cavity 34b and an outer circumferential-side cavity 34c) respectively extend from both longitudinal ends of the magnet loading region 34a, and further a pair of locking projections 34d projecting from an inner circumferential-side edge surface 35a of the respective embedding hole 34 into the respective embedding hole 34 in both longitudinal ends of the loading region 34a.

The loading region 34a is defined between the respective flat rectangular inner circumferential-side edge surface (inner circumferential long side) 35a and the respective flat rectangular outer circumferential-side edge surface (outer circumferential long side) 35b opposing parallel to the inner circumferential-side edge surface 35a with a slight gap therebetween. The inner circumferential-side cavity 34b is defined by a first inner surface 44a, a second inner surface 44b and a third inner surface 44c. The first inner surface 44a extends from one end of the outer circumferential-side edge surface 35b of the loading region 34a (an end on a respective d-axis side) towards the respective d-axis. The second inner surface 44b extends out from one end edge of the inner circumferential-side edge surface 35a of the loading region 34a (an end on a respective d-axis side, that is, the locking projection 34d) towards the central axis C of the rotor core 24 so as to be substantially parallel to the respective d-axis. The third inner surface 44c extends over to an extending end of the first inner surface 44a and an extending end of the second inner surface 44b so as to be substantially parallel to the respective d-axis. Note that both ends of the third inner surface 44c are connected to the first inner surface 44a and the second inner surface 44b, respectively, via a circular arc surface. The inner circumferential-side cavities 34b of each pair of two embedding holes 34 are arranged in such a manner that the third inner surfaces 44c thereof oppose each other while interposing the respective d-axes and the first bridge portion B1 therebetween.

The outer circumferential-side cavity 34c is defined by the first inner surface 46a, the second inner surface 46b and the third inner surface 46c. The first inner surface 46a extends from the other end of the outer circumferential-side edge surface 35b of the loading region 34a (an end on an outer circumferential surface side of the rotor core) towards the outer circumferential surface of the rotor core 24. The second inner surface 46b extends from the other end of the inner circumferential-side edge surface 35a of the loading region 34a (an end on an outer circumferential surface side of the rotor core, that is, the locking projection 34d) towards the outer circumferential surface of the rotor core 24. The third inner surface 46c extends over the extending end of the first inner surface 46a and the extending end of the second inner surface 46b along the outer circumferential surface of the rotor core 24. The bridge portion 38 is defined between the third inner surface 46c and the outer circumferential surface of the rotor core 24.

The inner circumferential-side cavity 34b and the outer circumferential-side cavity 34c function as a flux barrier which suppress the leaking of magnetic flux from both longitudinal ends of the respective permanent magnet 26 to the rotor core 24 and also contribute to reduction of the weight of the rotor core 24.

As shown in FIG. 2, the permanent magnets 26 are loaded to the respective embedding holes 34 and thus embedded in the rotor core 24. The permanent magnets 26 each are formed into, for example, a slender flat plate having a rectangular cross section, to have a length substantially equal to an axial length of the rotor core 24. The permanent magnets 26 each may be formed from a plurality of separate magnets combined along the axial direction (longitudinal direction), in which case, a total length of these magnets is set substantially equal to the axial length of the rotor core 24. Each permanent magnet 26 is embedded over substantially a full length of the rotor core 24. A magnetization direction of the permanent magnets 26 is a direction normal to the surface and the rear surface of each of the permanent magnets 26.

The permanent magnet 26 is loaded in the magnet loading region 34a of the respective embedding hole 34, and the first surface abuts against the inner circumferential-side edge surface 35a and the second surface abuts against the outer circumferential-side edge surface 35b. A pair of corner portions of the permanent magnet 26 each abut against the locking projection 34d. With this structure, each permanent magnet 26 is positioned in the respective loading region 34a. The permanent magnets 26 may be fixed to the rotor core 24 by an adhesive or the like. A pair of two permanent magnets 26 located on respective sides of each d-axis are arranged in substantially a V-shape manner. More specifically, the two permanent magnets 26 are disposed such that the distance from the respective d-axis gradually expands from the inner circumferential-side edge towards the outer circumferential-side edge.

Each permanent magnet 26 is magnetized to a direction perpendicular to the first surface and the second surface. Each respective pair of two permanent magnets 26 located on respective sides of the respective d-axis, that is, two permanent magnets 26 constructing one magnetic pole are disposed so that the magnetization directions thereof are the same as each other. On the other hand, each respective pair of two permanent magnets 26 located on respective sides of the respective q-axis are disposed so that the magnetization directions thereof are reversed. With the above-described arrangement of these permanent magnets 26, in the outer circumferential portion of the rotor core 24, the region on each d axis forms one magnetic pole 40 at a center and the region on each q-axis forms an inter-magnetic pole region 42 at a center. In this embodiment, the rotary electric machine 10 is configured as a permanent magnet-embedded rotary electric machine with eight poles (four pairs of poles) and forty eight slots, in which the front and back of the N-pole and S-pole of the permanent magnets 26 are alternately arranged for each adjacent pair of magnetic poles 40, and the coils are formed by single-layer distributed winding.

As shown in FIG. 2, a plurality of cavity holes (hollow portions) 30 are formed in the rotor core 24. The cavity holes 30 each extend to penetrate through the rotor core 24 along its axial direction. The cavity hole 30 is located at substantially a diametrical center of the rotor core 24 on the respective q-axis and between two respective embedding holes 34 of each adjacent pair of magnetic poles. The cavity holes 30 each have a polygonal, for example, pentagonal cross-section. Each corner portion of the polygon may be arcuately curved. The cross section of each cavity hole 30 comprises a first edge 30a and a second edge 30b each extending from the respective d-axis to near the d-axes on both sides thereof, a third edge extending from a d-axial-side end of the first edge towards the central axis C to be substantially parallel to the d-axis, a fourth edge 30d extending from a d-axial-side end of the second edge towards the central axis C to be substantially parallel to the d-axis, and a fifth edge 30e extending over from an end of the third edge 30c to the an end of the fourth edge 30d, intersecting the q-axis and opposing an inner hole with a gap therebetween. The first edge 30a extends parallel to the inner circumferential-side edge surface 35a of the respective embedding hole 34 to oppose thereto with a predetermined gap therebetween. The second edge 30a extends parallel to the inner circumferential-side edge surface 35a of the embedding hole 34 of an adjacent magnetic poly to oppose thereto with a predetermined gap therebetween. The first edge 30a and the second edge 30b intersect each other on the respective q-axis.

The third edge 30b of the cavity hole 30 and the fourth edge 30d of the adjacent cavity hole 30 oppose parallel to each other while interposing the respective d-axis therebetween. A second bridge portion B2 is defined between the third edge 30b and fourth edge 30d. The second bridge portion B2 is arranged coaxially with the first bridge portion B1 along the respective d-axis, that is, aligned with the first bridge portion B1. When a half of the width (half width) of the first bridge portion B1 (a width along a direction normal to the d-axis) is represented by W1, and a half of the width (half width) of the second bridge portion B2 (a width along a direction normal to the d-axis) is represented by W2, the first and second bridge portions B1 and B2 are formed to satisfy the relationship: W1<W2.

The cavity holes 30 each function as a flux barrier which makes it difficult for magnetic flux to pass through, and they regulate flow of the interlinkage flux of the stator 12 and flow of the magnetic flux of each permanent magnet 26. Further, with the cavity holes 30 thus formed, the weight of the rotor core 24 can be reduced. When the weight of the rotor 14 is reduced, it is desirable that the cavity holes 30 be formed to be as large as possible within such a range that the strength of the rotor 14 can be maintained with respect to the centrifugal stress generated to the rotor 14. Therefore, according to the present embodiment, the rotor core 24 is formed to satisfy the relationship described below.

That is, in the cross section of the rotor 14 shown in FIG. 2, when:

A1 represents an area of a region defined by the respective d-axis (a respective polar central axis), the outer circumferential surface of the rotor core 24 and a first imaginary linear line L1 extending on the outer circumferential-side long edge 35b of the respective embedding hole 34 and intersecting the central axis d of the respective magnetic pole and the outer circumferential surface of the rotor core 24, (the region shaded by slanted lines), A2 represents an area of a region defined by the respective d-axis, the respective q-axis, the outer circumferential surface of the rotor core 24, a second imaginary linear line L2 extending on the inner circumferential-side long edge 35a of the respective embedding hole 34 and intersecting the d-axis and the outer circumferential surface of the rotor core 24, a third imaginary linear line L3 extending on the first edge 30a of the respective cavity hole 34 and intersecting the respective d-axis and q-axis, (the cross hatched region in the figure), W1 represents a half-width of the first bridge portion B1, and W2 represents a half-width of the second bridge portion B2, the rotor core 24 is formed to satisfy the relationship: $W2/W1 \leq (A1+A2)/A1$.

When the rotor core 24 is configured to satisfy the relationship provided above, that is, by removing the portion not functioning as the magnetic circuit of the rotor 14, the size of the cavity holes 30 can be increased to the maximum while keeping the strength of the rotor 14 to the centrifugal stress. By enlarging the cavity holes, the weight of the rotor 14 can be reduced, and accordingly the entire rotary electric machine can be lightened.

As described above, according to the present embodiment, a lightweight permanent magnet-shaped rotary electric machine can be obtained while maintaining the strength of the rotor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of magnetic poles, dimensions, shape and the like of the rotor are not limited to the embodiments described above, but can be variously changed depending on design. The cross-section of the inner circumferential-side cavities, outer circumferential-side cavities and the cavity holes are not limited to the shapes discussed in the embodiments, but can be selected from various kinds of shapes. The shape of the cavity holes is not limited to a pentagon, but may be of some other polygon. Note that the term "polygon" used here is not limited to those types in which the corners are acutely bent or the edges are linear, but it may be of such types that the corners are curved or rounded or the edges are partly or entirely curved.

What is claimed is:

1. A rotary electric machine comprising:
a stator comprising a stator core and an armature coil; and
a rotor comprising a shaft rotatable around a central axis,
a rotor core coaxially fixed to the shaft and comprising a plurality of magnetic poles arranged along a circumferential direction, and a plurality of permanent magnets embedded in the rotor core and disposed in the plurality of magnetic poles respectively,
the rotor core comprising a plurality of polar central axes each passing the central axis and a center of the respective magnetic pole and extending radially with respect to the central axis, two embedding holes in each of the plurality of magnetic poles, provided on respective sides of the respective polar central axis, in which the respective permanent magnets are loaded, a plurality of cavity holes each provided between each respective adjacent pair of magnetic poles to oppose the embedding holes, respectively, with a gap therebetween, a first bridge portion defined between the two embedding holes on each polar central axis, and a second bridge portion defined between each respective adjacent pair of two cavity holes on each polar central axis,
in each of the plurality of magnetic poles, the two embedding holes and two permanent magnets each comprising an inner circumferential-side edge adjacent to the respective polar central axis and an outer circumferential-side edge adjacent to an outer circumferential surface of the rotor core, and disposed to be line symmetrical with respect to the respective polar central axis such that a distance from the polar central axis gradually expands from the inner circumferential-side edge toward the outer circumferential-side edge,
each of the embedding holes comprising a magnet loading region in which the respective permanent magnet is located, defined by an inner circumferential-side long edge and an outer circumferential-side long edge opposing parallel to each other, an inner circumferential-side cavity expanding from the inner circumferential-side edge of the respective permanent magnet towards the respective polar central axis, and an outer circumferential-side cavity expanding from the outer circumferential-side edge of the respective permanent magnet towards the circumferential surface,
each of the plurality of cavity holes being defined by a first edge and a second edge opposing with a gap from the inner circumferential-side long edges of the respective embedding holes provided in each respective adjacent pair of magnetic poles, and a third edge and a fourth edge opposing with a gap from the polar central axis of each of the adjacent pair of magnetic poles, and
where, in each magnetic pole, an axis electrically orthogonal to the respective polar central axis is defined as a q-axis,
A1 represents an area of a region defined by the respective polar central axis, the outer circumferential surface of the rotor core and a first imaginary linear line extending on the outer circumferential-side long edge of the respective embedding hole and intersecting the respective polar central axis and the outer circumferential surface of the rotor core, A2 represents an area of a region defined by the respective polar central axis, the respective q-axis, the outer circumferential surface of the rotor core, a second imaginary linear line extending on the inner circumferential-side long edge of the respective embedding hole and intersecting the respective polar central axis and the outer circumferential surface of the rotor core, a third imaginary linear line extending on the first edge of the respective cavity hole and intersecting the respective polar central axis and the respective q-axis, W1 represents a half-width of the first bridge portion, and W2 represents a half-width of the second bridge portion, the rotor core satisfying a relationship:

$$W2/W1 \leq (A1+A2)/A1.$$

2. The rotary electric machine of claim 1, wherein the first edge and the second edge of the respective cavity hole each extend substantially parallel to the inner circumferential-side long edge of the embedding hole and intersect each other on the respective q-axis.

3. The rotary electric machine of claim 2, wherein
the rotor core comprises an inner hole in which the shaft is inserted to fit therein, and
each of the cavity holes is disposed to oppose the inner hole of the rotor core with a gap therebetween, and formed into a pentagonal shape comprising a fifth edge connected to the third edge and forth edge.

4. The rotary electric machine of claim 2, wherein the half width W2 is greater than the half width W1.

5. The rotary electric machine of claim 1, wherein
the rotor core comprises an inner hole in which the shaft is inserted to fit therein, and
each of the cavity holes is disposed to oppose the inner hole of the rotor core with a gap therebetween, and formed into a pentagonal shape comprising a fifth edge connected to the third edge and forth edge.

6. The rotary electric machine of claim 1, wherein the half width W2 is greater than the half width W1.

* * * * *